United States Patent
Kwak et al.

(10) Patent No.: US 10,341,429 B2
(45) Date of Patent: Jul. 2, 2019

(54) APPARATUS AND METHOD FOR CONFIGURING SERVICE FUNCTION PATH OF SERVICE FUNCTION CHAIN BASED ON SOFTWARE DEFINED NETWORK

(71) Applicant: Electronics and Telecommunications Research Institute, Daejeon (KR)

(72) Inventors: Ji Young Kwak, Gwangju (KR); Sae Hoon Kang, Daejeon (KR); Hyun Joo Bae, Daejeon (KR); Gwang Woo Park, Gwangmyeong-si (KR); Sang Heon Pack, Seoul (KR); Ho Sung Baek, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 15/628,425

(22) Filed: Jun. 20, 2017

(65) Prior Publication Data

US 2018/0103091 A1   Apr. 12, 2018

(30) Foreign Application Priority Data

Oct. 10, 2016   (KR) .................. 10-2016-0130804

(51) Int. Cl.
| | |
|---|---|
| H04L 29/08 | (2006.01) |
| H04L 12/24 | (2006.01) |
| H04L 12/721 | (2013.01) |
| H04L 12/26 | (2006.01) |

(52) U.S. Cl.
CPC ...... *H04L 67/1034* (2013.01); *H04L 41/5041* (2013.01); *H04L 45/127* (2013.01); *H04L 67/10* (2013.01); *H04L 41/5025* (2013.01); *H04L 43/08* (2013.01); *H04L 43/0817* (2013.01)

(58) Field of Classification Search
CPC .................................................. H04L 67/1034
See application file for complete search history.

(56) References Cited

U.S. PATENT DOCUMENTS

| | | | |
|---|---|---|---|
| 7,142,544 B2 | 11/2006 | Kim et al. | |
| 9,444,675 B2* | 9/2016 | Guichard | H04L 41/5038 |
| 9,571,405 B2* | 2/2017 | Pignataro | H04L 47/2441 |
| 9,608,896 B2* | 3/2017 | Kumar | H04L 41/12 |
| 9,762,402 B2* | 9/2017 | Batz | H04L 12/1407 |

(Continued)

FOREIGN PATENT DOCUMENTS

| | | |
|---|---|---|
| JP | 2015-0012531 A | 1/2015 |
| KR | 10-2015-0088559 A | 8/2015 |

*Primary Examiner* — Andrew Lai
*Assistant Examiner* — Andrew C Lee
(74) *Attorney, Agent, or Firm* — Rabin & Berdo, P.C.

(57) ABSTRACT

A method for configuring a service function path (SFP) for a software defined network (SDN) based service function chain (SFC) may comprise configuring a SFC which is a set of ordered service functions (SFs) by reflecting requirements of a flow flowing into a network; generating a primary SFP that is a path through which the flow is to be actually transmitted in the network according to the SFC; generating a secondary SFP against an error of the primary SFP; and controlling a transmission path through which the flow is transmitted to be at least one of the primary SFP and the secondary SFP.

8 Claims, 8 Drawing Sheets

(56) References Cited

U.S. PATENT DOCUMENTS

| | | | |
|---|---|---|---|
| 2002/0188711 A1* | 12/2002 | Meyer | G06F 3/0605 |
| | | | 709/223 |
| 2006/0112219 A1* | 5/2006 | Chawla | G06F 3/0607 |
| | | | 711/114 |
| 2014/0307744 A1* | 10/2014 | Dunbar | H04L 45/44 |
| | | | 370/401 |
| 2015/0071289 A1 | 3/2015 | Shin et al. | |
| 2015/0200838 A1* | 7/2015 | Nadeau | H04L 45/124 |
| | | | 398/58 |
| 2015/0215156 A1 | 7/2015 | Yoon | |
| 2015/0326473 A1* | 11/2015 | Dunbar | H04L 12/4633 |
| | | | 370/392 |
| 2016/0094667 A1* | 3/2016 | Jani | H04L 69/32 |
| | | | 709/202 |
| 2016/0119253 A1* | 4/2016 | Kang | H04L 67/2814 |
| | | | 370/228 |
| 2016/0134481 A1* | 5/2016 | Akiya | H04L 41/5058 |
| | | | 709/224 |
| 2016/0344565 A1* | 11/2016 | Batz | H04L 12/1407 |
| 2016/0344803 A1* | 11/2016 | Batz | H04L 12/1407 |
| 2017/0019302 A1* | 1/2017 | Lapiotis | H04L 41/145 |
| 2017/0093658 A1* | 3/2017 | Ryan | H04L 43/067 |
| 2017/0251065 A1* | 8/2017 | Furr | H04L 67/16 |
| 2017/0288971 A1* | 10/2017 | Jayaraman | H04L 41/12 |
| 2017/0339130 A1* | 11/2017 | Reddy | H04L 63/0823 |
| 2018/0013841 A1* | 1/2018 | Nainar | H04L 45/72 |

* cited by examiner

FIG. 10

APPARATUS AND METHOD FOR CONFIGURING SERVICE FUNCTION PATH OF SERVICE FUNCTION CHAIN BASED ON SOFTWARE DEFINED NETWORK

CLAIM FOR PRIORITY

This application claims priorities to Korean Patent Application No. 2016-0130804 filed on Oct. 10, 2016 in the Korean Intellectual Property Office (KIPO), the entire contents of which are hereby incorporated by reference.

BACKGROUND

1. Technical Field

The present invention relates to a software defined network (SDN), and more particularly, to apparatuses and methods for supporting high availability of a service function chain (SFC) in a SDN.

2. Related Art

As the network provides various services, dependency on a middle box service (i.e., Service Function (SF)), such as firewall, deep packet inspection (DPI), and network address translation (NAT) is increasing for security maintenance and performance improvement. In particular, Service Function Chaining (SFC) technology is a standard technology for ordering multiple network services as a single connection according to the requirements of a specific flow. A Network Function Virtualization (NFV) industry standardization group (ISG) under the European Telecommunications Standards Institute (ETSI) and a Working Group (WG) under the International Engineering Task Force (IETF) are developing standards for the SFC technology.

In order for the SFC technology to operate properly according to purposes and policies of a service provider, it is necessary to recognize the types of various traffic occurring in the network in real time and to generate and provide SFCs suitable for the corresponding traffic. However, there is a problem that many SFs currently used are difficult to change policies dynamically according to changes in the network. For example, as networks become increasingly complex, there is a growing need to manage large numbers of SFs flexibly and dynamically. However, existing management techniques are difficult to cope with dynamic situations because administrators manually apply policies to the SFs, resulting in high complexity and management costs.

Such the management challenge may be addressed through the SDN technology. For example, since data planes and control planes are separated in the SDN, the SDN's centralized controller structure and flexible programming capabilities make it possible to dynamically apply SF policies according to network conditions, and make it possible to add a new control plane while maintaining the existing structure. However, research on high availability of the SDN-based controller is being actively carried out, but there is little research on high availability of the SFC. That is, in order to apply the SFC technology to a large-scale network infrastructure, survivability and performance of the service traffic should be guaranteed by the high availability of the SFC.

SUMMARY

Accordingly, example embodiments of the present invention are provided to substantially obviate one or more problems due to limitations and disadvantages of the related art.

Example embodiments of the present invention provide methods and apparatuses of configuring a service function path (SFP) of a software defined network (SDN) based service function chain (SFC) for supporting high availability of the SFC, which can ensure survivability and performance in applying SDN-based SFC technologies to a large-scale network infrastructure such as a data center or a mobile communication network.

In order to achieve the above-described objective, an aspect of the present disclosure provides a method for configuring a service function path (SFP) for a software defined network (SDN) based service function chain (SFC) comprising configuring a SFC which is a set of ordered service functions (SFs) by reflecting requirements of a flow flowing into a network; generating a primary SFP that is a path through which the flow is to be actually transmitted in the network according to the SFC; generating a secondary SFP against an error of the primary SFP; and controlling a transmission path through which the flow is transmitted to be at least one of the primary SFP and the secondary SFP.

In order to achieve the above-described objective, another aspect of the present disclosure provides an apparatus for configuring a service function path (SFP) for a software defined network (SDN) based service function chain (SFC) comprising a SFC configuration unit configuring a SFC which is a set of ordered service functions (SFs) by reflecting requirements of a flow flowing into a network; a primary SFP generation unit generating a primary SFP that is a path through which the flow is to be actually transmitted in the network according to the SFC; a secondary SFP generation unit generating a secondary SFP against an error of the primary SFP; and a flow transmission control unit controlling a path through which the flow is transmitted to be at least one of the primary SFP and the secondary SFP.

Using the embodiments according the present disclosure, a secondary SFP that minimizes network links shared by a primary SFP while constructing the primary SFP according to a SFC requested by a flow entering a network is constructed so that it is made possible to provide a continuous service using the secondary SFP even if an error occurs in a service function or a network link in the primary SFP, and the flow can be distributedly processed using the two paths for network load balancing.

Therefore, it is made possible to support robust SFC technologies for the traffic that is rapidly increasing in a large-scale network infrastructure such as a real business network by ensuring high availability and performance of the SFC.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to those of ordinary skill in the art. Also, descriptions of functions and constructions that are well known to those of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to those of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart.

To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist those of ordinary skill in the art in gaining a comprehensive understanding of the methods, apparatuses, and/or systems described herein.

The present disclosure proposes algorithms for high availability of a SFC of a SDN controller which configures a SFP so as to ensure survivability and performance of an SDN-based SFC.

As new network traffic is introduced, the SDN controller may configure a SFC and create a primary SFP. Thereafter, according to an embodiment of the present disclosure, in order to ensure the survivability and performance of the SFC, a secondary SFP may also be configured in order to distribute errors such that errors occurring in the primary SFP and a large amount of traffic do not concentrate on the primary SFP. That is, the secondary SFP may be used for flow distribution for network load balancing, and even if an error occurs in the primary SFP, another path (i.e., the secondary SFP) may be used to provide a continuous service for the flow.

According to an embodiment of the present disclosure, the following two points should be considered in configuring the secondary SFP.

First, the secondary SFP may be configured such that shared links between the primary SFP and the secondary SFP are minimized. This is to minimize influence which the error occurring on the primary SFP exerts on the secondary SFP, and to minimize bottleneck caused by sharing one SF to another flow for efficient flow distribution.

Second, the amount of traffic necessary for synchronization of state information between the primary SFP and the secondary SFP may be controlled to a desired level by an administrator. Among the SFs constituting the SFC, there may be SFs that require state information on the network flow. In this case, state information synchronization should be performed between SFs on the primary SFP and the secondary SFP, so that the secondary SFP can provide continuous service when the secondary SFP is used. In the present disclosure, the network load caused by the traffic used for the synchronization is controlled to a desired level by the administrator.

Hereinafter, a method of configuring a SFP, which is capable of supporting high availability of an SDN-based SFC and has the above-described characteristics, will be described with reference to FIG. 1.

Figure 1:
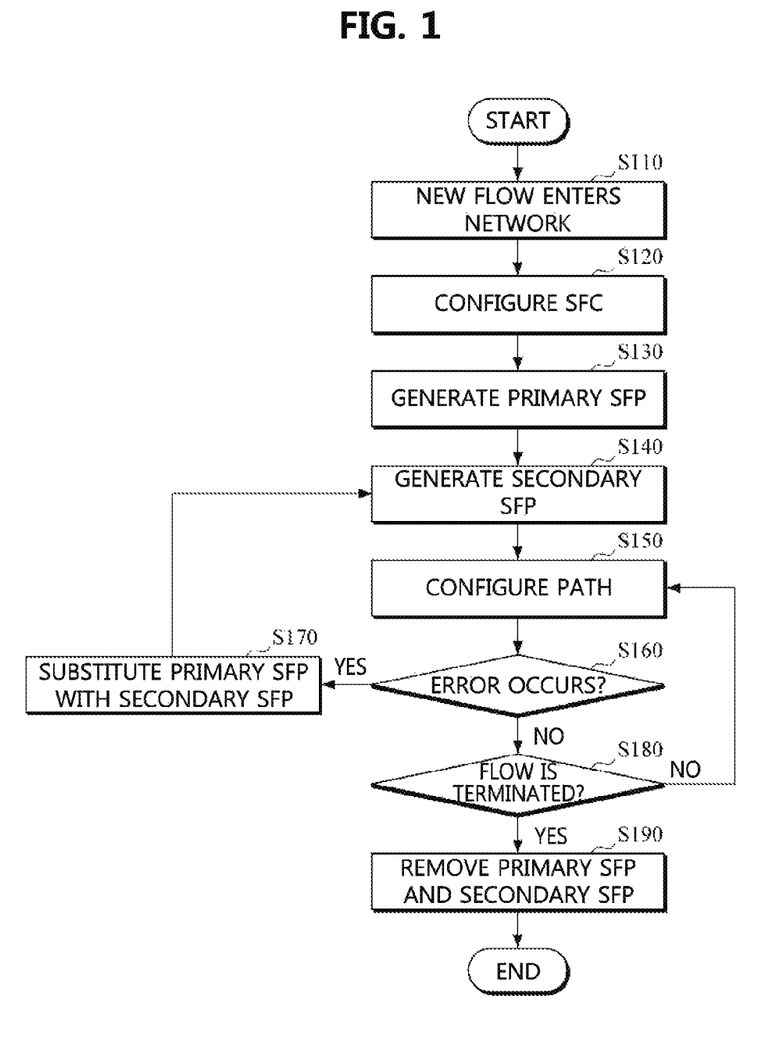
FIG. 1 is a flowchart illustrating a SFP configuration method for supporting high availability of an SDN-based SFC according to an embodiment of the present disclosure.

FIG. 1 is a flowchart illustrating a SFP configuration method for supporting high availability of an SDN-based SFC according to an embodiment of the present disclosure.

Referring to FIG. 1, when a new flow enters a network (S110), a SDN controller may configure an SFC, which is a set of ordered SFs, so that requirements of the flow are reflected (S120). Then, a primary SFP that is a path through which the flow is actually transmitted in the network may be generated according to the SFC (S130). After the primary SFP is generated, a secondary SFP for flow distribution may be generated in consideration of load balancing in preparation for a failure of the primary SFP (S140). At this time, the secondary SFP may be configured such that the shared links between the primary SFP and the secondary SFP are minimized according to an embodiment of the present disclosure. A detailed description thereof will be described later.

Then, configuration of a path may be controlled so that the flow passes through at least one of the primary SFP and the secondary SFP (S150). Although not illustrated in the drawing, as packets are transmitted through the ordered SFs in the SFC, state information on the flows may be generated in the SFs existing in the primary SFP, the state information may be continuously transmitted to the corresponding SFs of the secondary SFP, and the state information may be synchronized between the SFs on the primary SFP and the SFs on the secondary SFP. Here, according to an embodiment of the present disclosure, the amount of traffic required for synchronization of state information between each SF on the primary SFP and the corresponding SF on the secondary SFP may be controlled to a desired level by the administrator. A detailed description thereof will be described later.

If an error occurs in the primary SFP in the transmission of the flow (S160), the path of the flow may be changed so that the flow is transferred to the secondary SFP (S170). Also, after the primary SFP is substituted with the secondary SFP, the secondary SFP takes a role of the primary SFP as a new primary SFP, and a new secondary SFP may be configured to synchronize the state information of the SFs with the new primary SFP (i.e., the previous secondary SFP) through the same process as described above (S140).

Meanwhile, when the use of the flow is terminated (S180), the operation may be completed by removing the primary SFP and the secondary SFP for the flow (S190).

Figure 2:
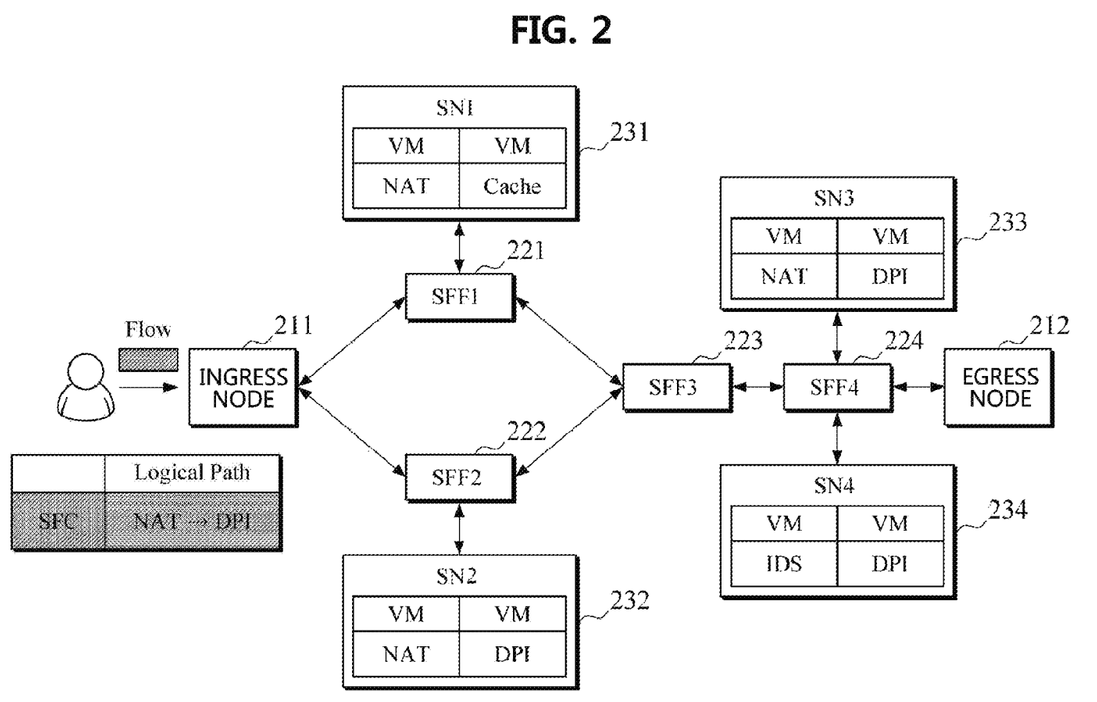
FIG. 2 is a structural diagram of a network providing an SDN-based SFC according to an embodiment of the present disclosure.

FIG. 2 is a structural diagram of a network providing an SDN-based SFC according to an embodiment of the present disclosure.

Referring to FIG. 2, a network providing an SDN-based SFC may be assumed to be an overlay network operating on a physical network, and the network may comprise an ingress node 211, an egress node 212, service function forwarders (SFFs) 221, 222, 223, and 224, service nodes (SNs) 231, 232, 233, and 234, and links connecting them.

The ingress node 211 may be a node through which a new flow enters the network, and the flow may exit the network through the egress node 212 after passing through all required SFs.

The SNs 231, 232, 233, and 234 may be nodes that implement various SFs on virtual machines (VMs), and may be connected to one or more SFFs 221, 222, 223, and 224.

The SFFs 221, 222, 223, and 224, as nodes forwarding the flows according to the configured SFC, may constitute the network as being connected to each other. Also, the SFFs 221, 222, 223, and 224 may be connected to one or more SNs 231, 232, 233, and 234. The link connecting respective nodes may support bidirectional communications.

Figure 3:
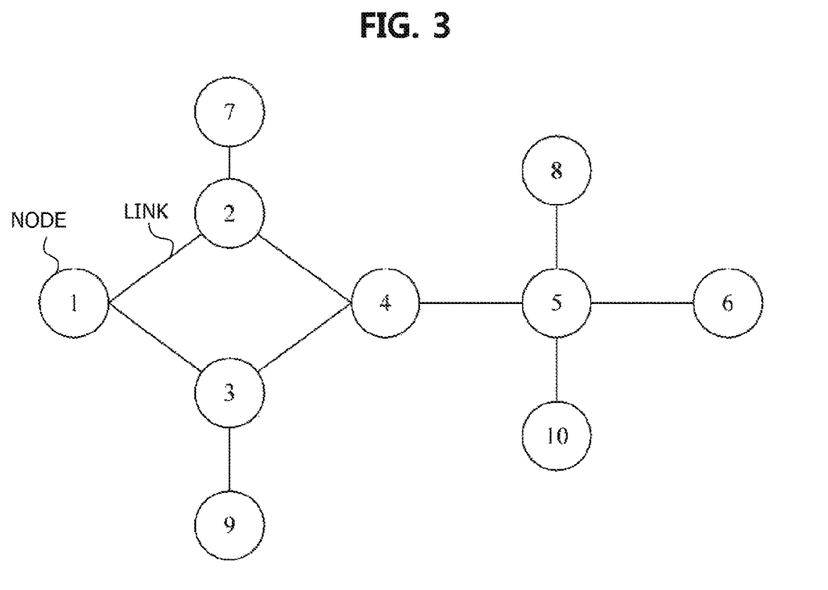
FIG. 3 is a graph illustrating a network supporting SFC of FIG. 2 according to an embodiment of the present disclosure.

FIG. 3 is a graph illustrating a network supporting SFC of FIG. 2 according to an embodiment of the present disclosure.

Referring to FIG. 3, the entire network illustrated in FIG. 2 may be represented by a graph G=(V, E) composed of vertexes (nodes) and edges (links) using a graph theory.

A node set V may consist of a SN node set $V_{SN}$, a SFF node set $V_{SFF}$, an ingress node $V_{ing}$, and an egress node $V_{eg}$. That is, $V=V_{SN} \cup V_{SFF} \cup V_{ing} \cup V_{eg}$.

A link set E may consist of links (i, j) each of which represents connection between two nodes. $L_{i,j}$ may be a value indicating whether there is a link between two nodes. In a case that this value is set to 1, it may indicate that a node denote by 'i' and a node denoted by 'j' are connected by a link. Also, each link has a bandwidth of $C_{i,j}$.

The SN may create one or more VMs and own various SFs, and the number of SFs installed in the SN i may be defined as $N_{i,M}$. Also, a binary variable $Q_{i,h,t}$ may be used to denote the type of each SF. That is, when $Q_{i,h,t}$ is 1, it may mean that a SF h of the SN i is a SF of t type. In the present disclosure, it may be assumed that $N_T$ types of SFs are totally used in the network (e.g., NAT, Firewall, DPI, etc.). Also, each SF uses limited resources. $R_{i,h,l}$ is an integer equal to or greater than 0, and may represent the remaining amount of resources l possessed by the SF h of the SN i and may be expressed by a value quantized according to the characteristics of each resource. In the present disclosure, it may be assumed that $N_L$ types of resources (e.g., CPU, Memory, Storage, etc.) are totally used in the SFs.

As describe above, an SFC is a set of ordered SFs whose flows are to be processed. That is, one SFC may consist of $N_M$ ordered SFs. $f_{m,t}$ is a binary variable for defining the type of the m-th SF to be used, and when $f_{m,t}$ is 1, it may mean that the type of the m-th SF in the SFC is the type t.

An SFP is a path through which a flow is actually transmitted in the network, and the SFP may specify SFs on the VM that actually process the packets of the corresponding flow. In the present disclosure, a primary SFP and a secondary SFP prepared for flow distribution and errors of the primary SFP may exist for a single flow.

First, $V_{m,i,h}$ is a binary variable representing SFs responsible for packet processing. In a case that this value is 1, SF h of SN i is used as the m-th SF on the primary SFP. Also, $W_{m,i,h}$ is a binary variable. In a case that this value is 1, it may mean that SF h of SN i is used as the m-th SF on the secondary SFP.

$X_{m,i,j}$ is a binary variable for representing a packet forwarding path of the primary SFP. In a case that this value is 1, it may mean that the packet is forwarded from the node i to the node j in order to transmit the packet to the m-th SF. $Y_{m,i,j}$ is used in the same manner as a binary variable for representing a packet forwarding path of the secondary SFP. When the SFC is composed of $N_M$ ordered SFs, and $X_{N_M+1,i,j}$ and $Y_{N_M+1,i,j}$ may be used to represent a forwarding path for transmitting packets from the $N_M$-th SF to the egress node. $Z_{m,i,j}$ is a binary variable for representing a packet forwarding path for synchronization between m-th SFs in the primary SFP and the secondary SFP. The flow entering the network may require a link bandwidth B depending on its size, and the link bandwidth required for synchronization between the m-th SFs is $B_m$. Also, the amount of resource l required by the m-th SF to process the flow is defined as $D_{m,l}$. The variables used in the present disclosure may be summarized in Table 1 below.

TABLE 1

| Variable | Definition |
| --- | --- |
| V | Node sets (SN, SFF, ingress node, egress node) |
| E | Link set |
| $C_{i,j}$ | A bandwidth of a link (i,j) |
| $Q_{i,h,t}$ | A binary value for indicating whether SF h of SN i belongs to the type t |
| $R_{i,h,t}$ | The remaining amount of resources l in SF h of SN i |

TABLE 1-continued

| Variable | Definition |
| --- | --- |
| $f_{m,t}$ | A binary value for indicating whether m-th SF of a SFC belongs to the type t |
| $V_{m,i,h}$ | A binary value for indicating whether SF h of SN i is the m-th SF of a primary SFP |
| $W_{m,i,h}$ | A binary value for indicating whether SF h of SN i is the m-th SF of a secondary SFP |
| $X_{m,i,j}$ | A binary value indicating whether packets are forwarded from node i to node j in order to transfer packets to the m-th SF of the primary SFP |
| $Y_{m,i,j}$ | A binary value indicating whether packets are forwarded from node i to node j in order to transfer packets to the m-th SF of the secondary SFP |
| $Z_{m,i,j}$ | A binary value indicating whether packets are forwarded from node i to node j in order to synchronize the m-th SFs of the primary SFP and the secondary SFP |
| B | A link bandwidth required for transmission of a flow |
| $B_m$ | A link bandwidth required for synchronization between the m-th SFs |
| $D_{m,l}$ | The amount of resource/required for the m-th SF to process the flow |

Meanwhile, in generating the secondary SFP as described above, it may be necessary to consider the following two points. First, it may be required that the secondary SFP is configured such that the links shared with the primary SFP are minimized in consideration of the traffic required for the synchronization of the state information of respective SFs on the primary SFP and the secondary SFP.

The packet forwarding path information $Y_{m,i,j}$ of the secondary SFP satisfying such the conditions may be obtained, and it may be assumed that the packet forwarding path information $X_{m,i,j}$ of the primary SFP is already given through another algorithm or the like. An objective function minimizing the shared links may be defined as Equation 1 below.

$$\min \sum_{i \in V} \sum_{j \in V} \sum_{m_1=1}^{N_M+1} \sum_{m_2=1}^{N_M+1} \{(X_{m_1,i,j} + X_{m_1,j,i}) y_{m_2,i,j}\} \quad \text{[Equation 1]}$$

Since $X_{m,i,j}$ and $Y_{m,i,j}$ of Equation 1 are binary values indicating whether or not the corresponding link is used in the primary SFP and the secondary SFP, the objective function is defined as minimizing cases where both the primary SFP and the secondary SFP are used on the same link (i,j) and (j,i).

The process of obtaining the objective function of the present disclosure may be represented by Integer Linear Programming (ILP) because the variables constituting the objective function and constraint conditions are all binary variables. These problems may be solved by various ILP solvers (eg, IBM Cplex, Matlab, GLPK, LP_Solve, etc.).

Figure 4:
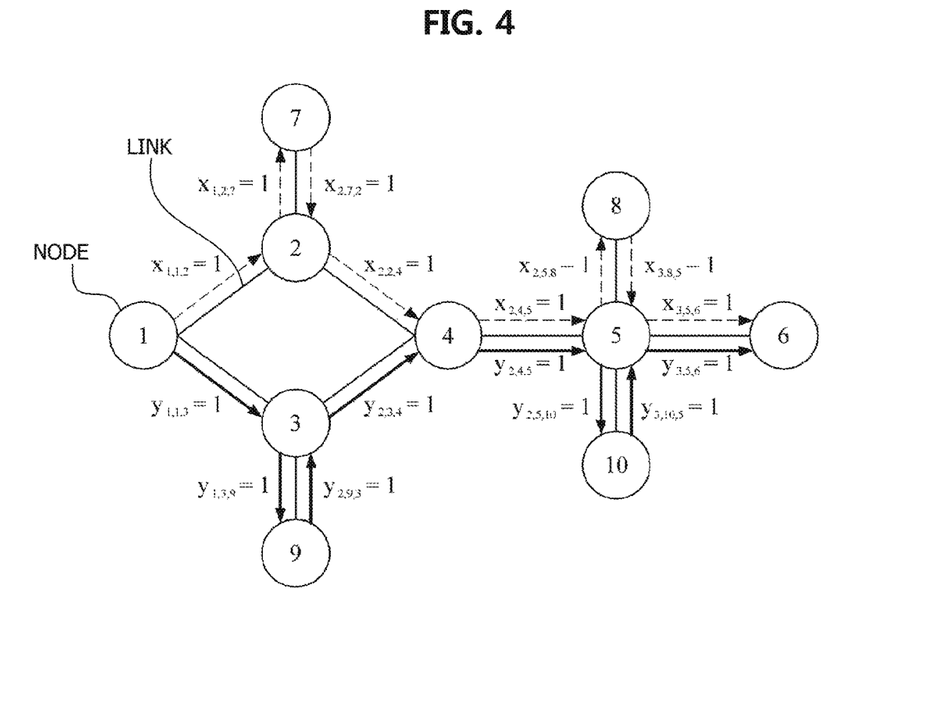
FIG. 4 is a diagram illustrating paths of a primary SFP and a secondary SFP obtained through an objective function for configuring the secondary SFP that minimizes links shared with the primary SFP based on the SFC-supporting network of FIG. 2.

FIG. 4 is a diagram illustrating paths of a primary SFP and a secondary SFP obtained through an objective function for configuring the secondary SFP that minimizes links shared with the primary SFP based on the SFC-supporting network of FIG. 2.

Referring to FIG. 4, a flow entering the network through the ingress node denoted as '1' may be transmitted to the egress node denoted as '6' via a NAT and a DPI.

In the primary SFP, packets are transmitted to the egress node 6 via the NAT of the SN1 denoted as '7' and the DPI of the SN3 denoted as '8'. Also, in the secondary SFP for the primary SFP, packets are transmitted to the egress node 6 via the NAT of the SN2 denoted as '9' and the DPI of the SN4 denoted as '10'.

In the path of the primary SFP, a routing path from the NAT of the SN1 (i.e., node 7) to the DPI of SN3 (i.e., node 8) may be represented as $x_{2,7,2}=x_{2,2,4}=x_{2,4,5}=x_{2,5,8}=1$. Also, the secondary SFP for the primary SFP may be defined as $y_{2,9,3}=y_{2,2,4}=y_{2,4,5}=y_{2,5,10}=1$. Since the primary SFP and the secondary SFP share the link (4,5) and the link (5, 6) in the entire path, a result value of the objective function may become 2.

Next, a constraint condition for controlling state information synchronization traffic between the primary SFP and the secondary SFP will be described.

The present disclosure aims at minimizing the shared links between the primary SFP and the secondary SFP and controlling the amount of traffic used for synchronization of state information between the two SFPs to a level desired by the administrator. This may be expressed by Equation 2 below.

$$\sum_{i \in V} \sum_{j \in V} \sum_{m=1}^{N_M} z_{m,i,j} \mathcal{B}_m \leq \delta \quad \text{[Equation 2]}$$

In Equation 2, $Z_{m,i,j}$ is a binary value indicating whether or not a link is used for synchronization between the m-th SF of the primary SFP and the secondary SFP, and $B_m$ represents a bandwidth required for synchronization between the m-th SFs. Thus, the traffic for synchronization generated in the entire network may be controlled under δ according to Equation 2.

Figure 5:
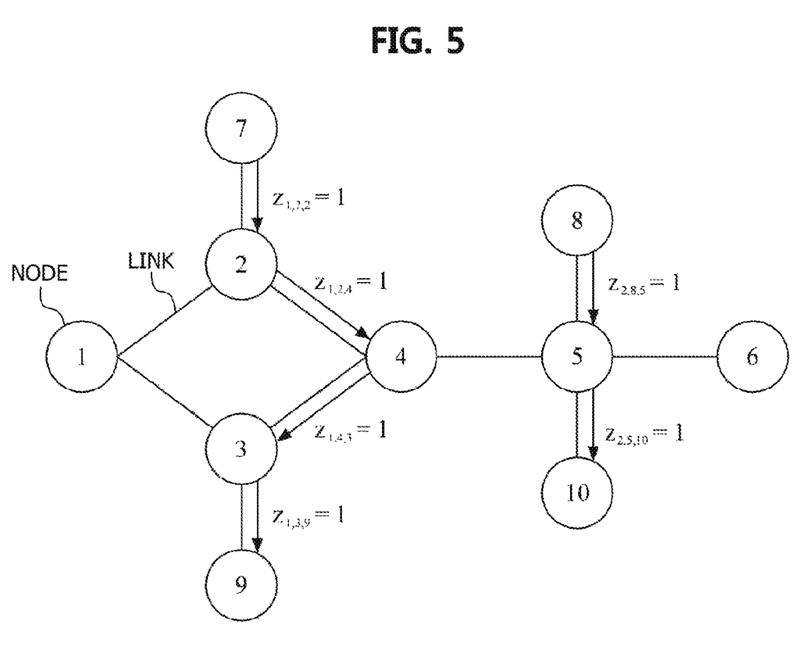
FIG. 5 is a diagram illustrating a routing path for synchronization of state information of SFs.

FIG. 5 is a diagram illustrating a routing path for synchronization of state information of SFs.

Referring to FIG. 5, a routing path for synchronization of state information between the DPI of the SN3 (i.e., node 8) used in the primary SFP and the DPI of the SN4 (i.e., node 10) used in the secondary SFP may be defined as $z_{2,8,5}=Z_{2,5,10}=1$.

In addition to the above-described conditions, other constraints for configuring the secondary SFP will be described.

First, Equations 3 to 6 are required to be satisfied for flow conservation.

$$\sum_{j \in V} y_{m,j,i} - \sum_{k \in V} y_{m,i,k} = 0, \forall i \in V_{SFF} \quad \text{[Equation 3]}$$

$$\sum_{j \in V} y_{1,j,i} - \sum_{k \in V} y_{1,i,k} = -1, \forall i \in V_{ing} \quad \text{[Equation 4]}$$

$$\sum_{j \in V} y_{N_M+1,j,i} - \sum_{k \in V} y_{N_M+1,i,k} = 1, \forall i \in V_{eg} \quad \text{[Equation 5]}$$

$$y_{m,i,j} = y_{m+1,j,i}, \forall i \in V_{SFF}, \forall j \in V_{SN}, \forall m \in \{1, \ldots, N_M\} \quad \text{[Equation 6]}$$

Equations 3 to 6 have the following meanings in order.

Equation 3 may imply that an incoming traffic to an SFF should be sent to another SFF, Equation 4 may imply that the ingress node delivers new traffic to another node, Equation 5 may imply that a flow is terminated when the traffic belonging to the flow is transmitted to the egress node, and Equation 6 may imply that the traffic transmitted from the SFF to the SN is transmitted to the SFF after being subjected to the required SF processing, and transmitted to the next SF.

Also, the bandwidth used for traffic transmission may not exceed the bandwidth allowed by each link. For this, Equation 7 below should be satisfied.

$$\sum_n y_{i,j}^n b_n + \sum_n y_{j,i}^n b_n \le c(i,j), \forall i, j \in V \quad \text{[Equation 7]}$$

Also, in the secondary SFP, traffics should be processed in all the SFs defined in the SFC. For this, when the number of SFs installed in the SN i is expressed as $N_{i,H}$, Equation 8 below should be satisfied.

$$\sum_{i \in V} \sum_{h=1}^{N_{i,H}} \sum_{t=1}^{N_T} Q_{i,h,t} w_{m,i,h} f_{m,t} = 1, \forall m \in \{1, \ldots, N_M\} \quad \text{[Equation 8]}$$

Figure 6:
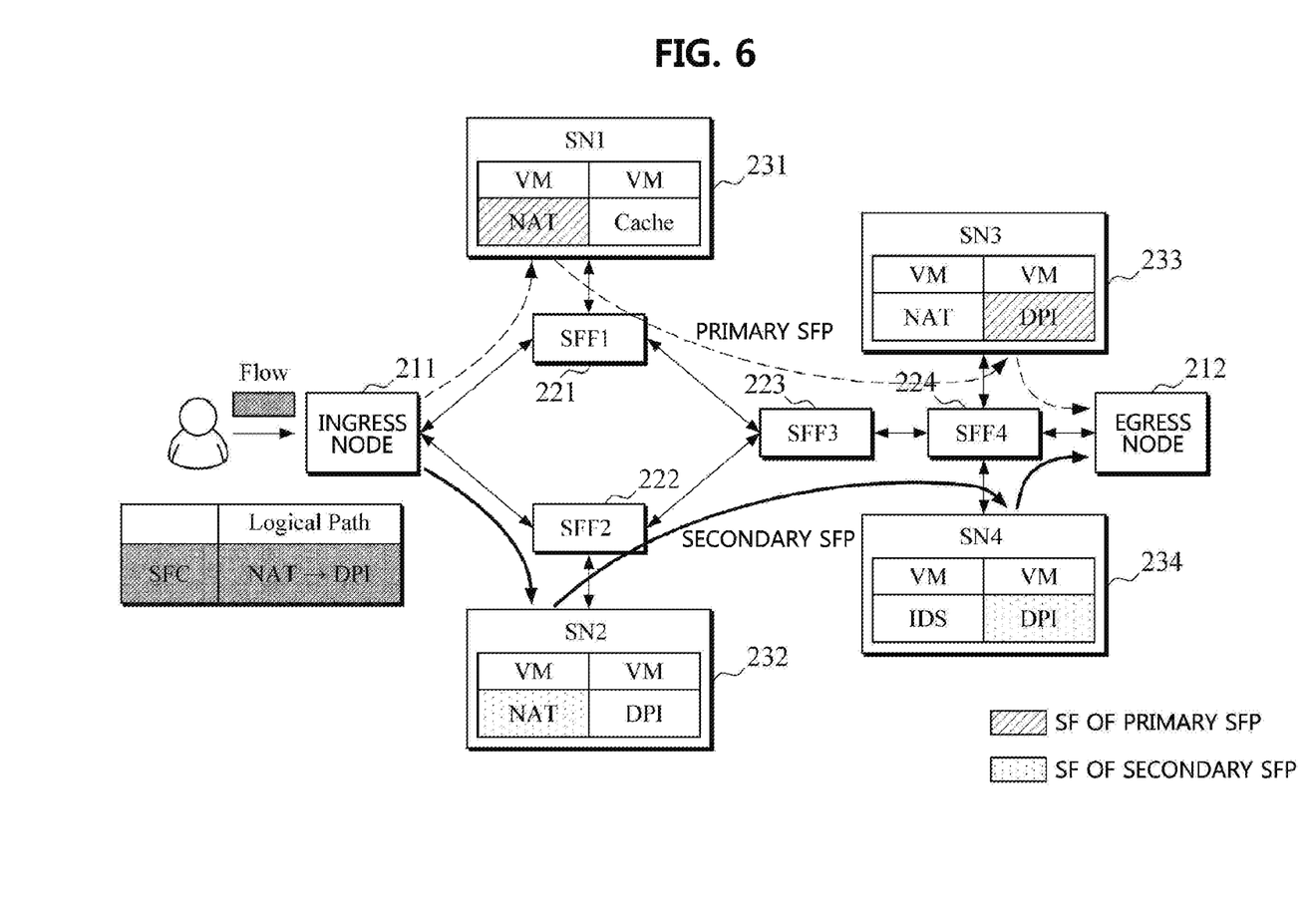
FIG. 6 is a diagram illustrating a result of configuring a primary SFP and a secondary SFP for the primary SFP by applying a method according to the present disclosure to the SFC supporting network environment of FIG. 2.

FIG. 6 is a diagram illustrating a result of configuring a primary SFP and a secondary SFP for the primary SFP by applying a method according to the present disclosure to the SFC supporting network environment of FIG. 2.

In the configuration, the secondary SFP should select either a NAT of SN2 (denoted as '232') or a NAT of SN3 (denoted as '233') in order to pass NAT, which is the first SF defined in the SFC. Here, the NAT of SN2 has been selected to minimize the shared links. Also, in order to pass a DPI which is the second SF defined in the SFC, the secondary SFP should select one of a DPI of SN2 and a DPI of SN4 (denoted as '234'). In this case, the DPI of SN4 has been selected to match the traffic required for synchronization to the requirements of the administrator. As a result, the secondary SFP arrives at the egress node (denoted as '212') from the ingress node (denoted as '211') through the NAT of the SN2 and the DPI of the SN4 in order.

Figure 7:
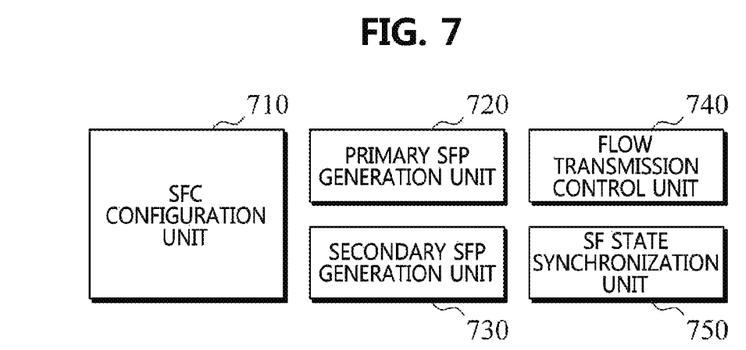
FIG. 7 is a block diagram illustrating a SFP configuration apparatus for an SDN-based SFC according to an embodiment of the present disclosure.
Figure 8:
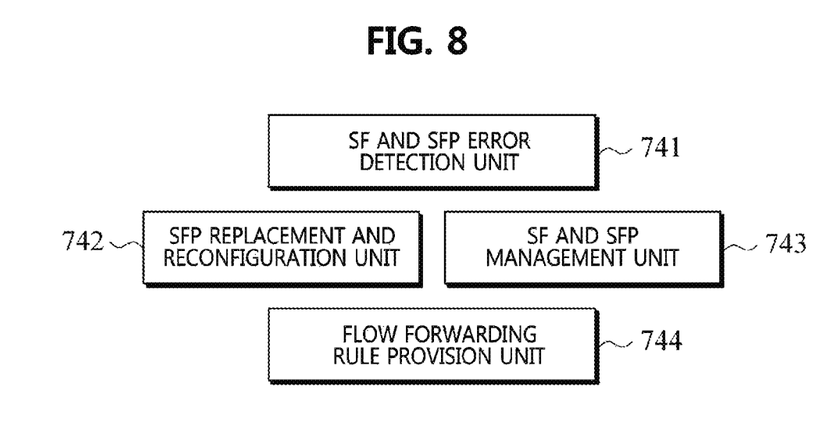
FIG. 8 is a detailed block diagram illustrating a flow transmission control unit according to an embodiment of the present disclosure.

FIG. 7 is a block diagram illustrating a SFP configuration apparatus for an SDN-based SFC according to an embodiment of the present disclosure, and FIG. 8 is a detailed block diagram illustrating a flow transmission control unit according to an embodiment of the present disclosure.

Here, the SFP configuration apparatus for the SDN-based SFC may be implemented in an SDN controller.

Referring to FIG. 7, the SFP configuration apparatus for the SDN-based SFC may comprise an SFC configuration unit 710, a primary SFP generation unit 720, a secondary SFP generation unit 730, and a flow transmission control unit 740. In addition, the SFP configuration apparatus may further comprise an SF state synchronization unit 750.

The SFC configuration unit 710 may configure an SFC that is a set of ordered SFs so that the requirements of a new flow entering the network are reflected.

The primary SFP generating unit 720 generates a primary SFP that is a path through which a flow is actually transmitted in the network according to the configured SFC.

The primary SFP generation unit 720 may generate a primary SFP that is a path through which a flow is actually transmitted in the network according to the configured SFC.

The secondary SFP generation unit 730 may generate a secondary SFP to be prepared for an error of the primary SFP. Here, the secondary SFP generation unit 730 may be configured to minimize the shared links between the primary SFP and the secondary SFP as described above. That is, the secondary SFP may be configured so that the objective function for excluding cases in which the same network links are used by both the primary SFP and the secondary SFP becomes a minimum value.

The flow transmission control unit 740 may control configuration of the paths so that the corresponding flow is transmitted through at least one of the primary SFP and the secondary SFP. When a problem occurs in the primary SFP in the process of transmitting the flow, the flow transmission control unit 740 may provide a continuous service by changing the path so that the flow is transferred to the secondary SFP. More specifically, the flow transmission control unit 740 may comprise a SF and SFP error detection unit 741, a SFP replacement and reconfiguration unit 742, a SF and SFP management unit 743, and a flow forwarding rule provision unit 744.

The SF and SFP error detection unit 741 may check whether a network link error or an SF operation error occurs on the transmission path during the flow is being transmitted to the primary SFP as the flow is introduced. When it is determined that a network link error or an SF operation error has occurred during the flow transmission, the SF and SFP error detection unit 741 may inform the occurrence of the error to the SF and SFP management unit 743 and the SFP replacement and reconfiguration unit 742.

Then, the SFP replacement and reconfiguration unit 742 may perform a task of replacing the transmission path of the flow from the primary SFP in which the error has occurred to the secondary SFP. Also, the SF and SFP management unit 743 may reconfigure a new primary SFP that is a transmission path of the corresponding flow through the SFP replacement and reconfiguration unit 742 such that a flow to be transmitted through the primary SFP is transmitted through the replaced secondary SFP, and instruct the SFP replacement and reconfiguration unit 742 to generate the secondary SFP for the change. When the reconfiguration for the new primary SFP is completed, the flow forwarding rule providing unit 745 may reconfigure a flow forwarding rule according to the reconfigured primary SFP.

Also, the SF state synchronization unit 750 may generate state information on the flow in the SFs existing on the primary SFP as the packet is transmitted in the order of the SFC, and perform synchronization of state information by continuously transmit the generated state information to the corresponding SFs on the secondary SFP. At this time, the SF state synchronization unit 750 may control the amount of traffic used for the synchronization of state information between the SFs on the primary SFP and the corresponding SFs on the secondary SFP to a predetermined value or less.

In the SFC standard draft document, threshold values for end-to-end service recovery times according to several service availability levels (SALs) are summarized, and a service high availability is emphasized, which is shown in Table 2 below.

TABLE 2

| SAL | Service Recovery Time Threshold | Customer type | Recommendation |
|---|---|---|---|
| 1 | 5~6 seconds | Network operator control traffic Government/Regulatory Emergency services | Redundant resources to be made available on-site to ensure fast recovery. |
| 2 | 10~15 seconds | Enterprise and/or large scale customers Network operator service traffic | Redundant resources to be available as a mix of on-site and off-site as appropriate: On-site resources to be utilized for recovery of real-time service; Off-site resources to be utilized for recovery of data services. |
| 3 | 20~25 seconds | General consumer Public and ISP traffic | Redundant resources to be mostly available off-site. Real-time services should be recovered before data services. |

Meanwhile, when SFC is supported using stateful virtualized network functions (VNFs), management of state information of such the network functions is implemented by utilizing an external virtual disk.

Figure 9:
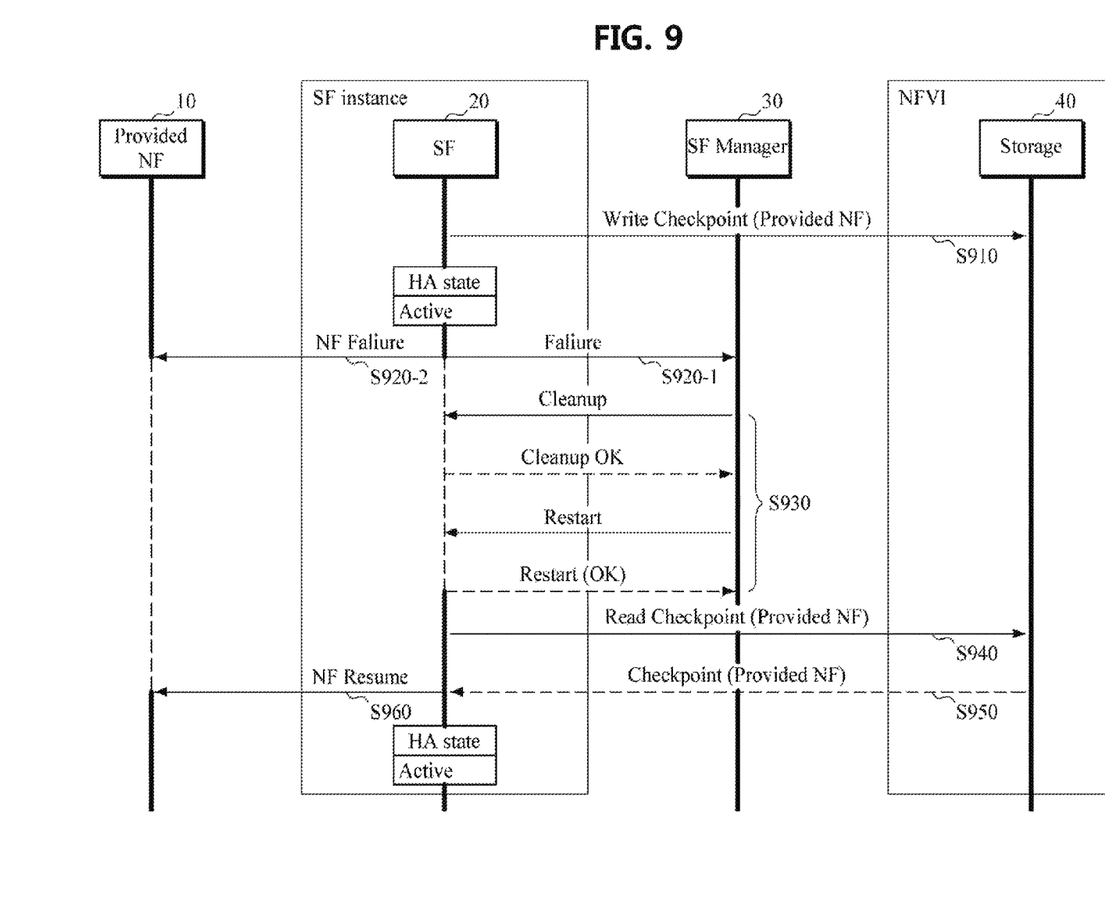
FIG. 9 is a flowchart for explaining a method of using an external virtual disk to manage state information of a corresponding network function when SFC is supported using a stateful virtualized network function (VNF)

FIG. 9 is a flowchart for explaining a method of using an external virtual disk to manage state information of a corresponding network function when SFC is supported using a stateful VNF.

Referring to FIG. 9, an SF instance 20 may periodically store corresponding state information in an external virtual disk 40 (S910). Then, when a SF failure situation occurs, the SF instance 20 may notify an NF 10 and an SF Manager 30 of this (S920-1, S920-2).

After steps for restarting the SF instance 20 are performed between the SF instance 20 and the SF Manager 30 (S930), the restarted SF instance 20 may read service state information (i.e., check point) updated just before the failure from the external virtual disk 40 (S940, S950), and the restarted SF instance 20 may provide continuous services (S960).

Figure 10:
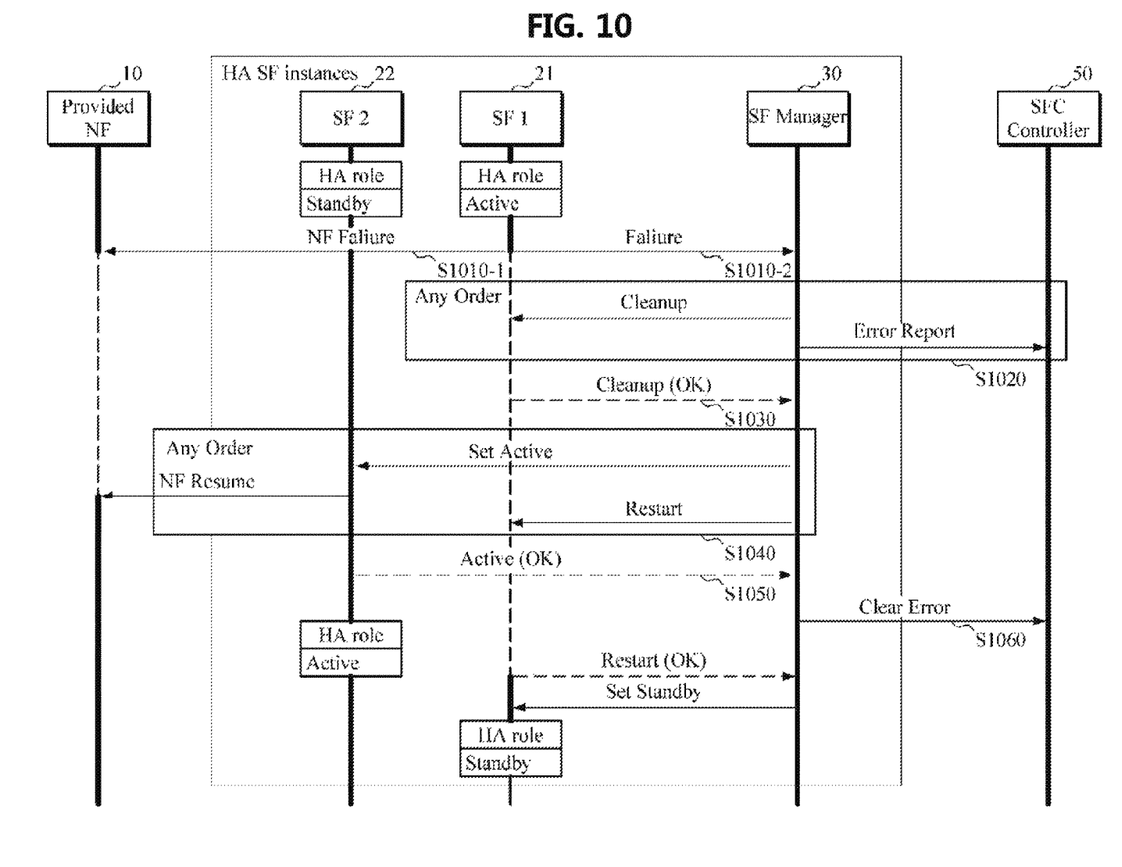
FIG. 10 is a flowchart for explaining an operation of preparing for an SF operation error on the SFP according to an embodiment of the present disclosure.

FIG. 10 is a flowchart for explaining an operation of preparing for an SF operation error on the SFP according to an embodiment of the present disclosure.

Referring to FIG. 10, an SF2 instance 22 may synchronize updated state information of the corresponding NF provided by the SFC with the SF1 instance through the SF state synchronization unit 750, so that services can be provided continuously through steps S1020 to S1060 even if an SF1 instance 21 on the primary SFP fails (S1010-1, S1010-2).

The SF and SFP error detection unit 741 may configure an error detection session by using error detection control packets between devices in which forwarding engines are operating so as to improve the detection and recovery time of the SFC due to a network link error or an SF operation error on the transmission path. When the error detection session is established between the forwarding engines, parameters related to transmission of the error detection control packets such as transmission period may be negotiated. The error detection control packets may be periodically transmitted according to the negotiated parameter, and the error detection control packets of the other party may be continuously monitored. When the forwarding engine uses an echo function to reduce the number of control packets transmitted periodically or to reduce complexity, it is possible to reduce mutual transmission jitter and provide a faster detection time.

If the error detection control packet is not transmitted for a predetermined time due to an error in the link or path, the configured error detection session may be terminated according to the transmission status of the control packets. In the asynchronous mode, if the error detection control packet is not received within a configured detection time, it is detected that an error has occurred and the error detection session is terminated. Using the echo function, the error detection session may be terminated if a certain amount of echo control packets for error detection are lost.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for configuring a service function path (SFP) for a software defined network (SDN) based service function chain (SFC), comprising at least one processor configured to execute instructions to implement:
   an SFC configuration unit configuring an SFC, which is a set of ordered service functions (SFs), by reflecting requirements of a flow flowing into a network;
   a primary SFP generation unit generating a primary SFP through which the flow is to be actually transmitted in the network according to the SFC;
   a secondary SFP generation unit generating a secondary SFP against an error of the primary SFP; and
   a flow transmission control unit controlling a transmission path through which the flow is transmitted to be at least one of the primary SFP or the secondary SFP;
   wherein the flow transmission unit comprises:
   an SF and SFP error detection unit checking whether a network link error or an SF operation error occurs on the primary SFP while the flow is being transmitted through the primary SFP, and notifying of the network link error or the SF operation error to an SF and SFP management unit and an SF and SFP replacement and reconfiguration unit in response to a determination that the network link error or the SF operation error has occurred on the primary SFP;

the SFP replacement and reconfiguration unit performing a task of replacing the transmission path of the flow from the primary SFP in which the network link error or the SF operation error has occurred to the secondary SFP;

the SF and SFP management unit instructing the SFP replacement and reconfiguration unit to substitute the primary SFP with the secondary SFP such that a flow to be transmitted through the primary SFP is transmitted through the secondary SFP and the secondary SFP is configured to be a new primary SFP, and to generate a new secondary SFP for the new primary SFP; and a flow forwarding rule provision unit reconfiguring a flow forwarding rule according to the new primary SFP when configuration for the new primary SFP is completed.

2. The apparatus according to claim 1, wherein the secondary SFP is generated by the primary SFP generation unit so that links shared between the primary SFP and the secondary SFP is minimized.

3. The apparatus according to claim 1, further comprising a SF state information synchronization unit generating state information on the flow in SFs existing on the primary SFP as the flow is transmitted in order of the SFC, and synchronizing the primary SFP and the secondary SFP by transmitting the state information continuously to SFs on the secondary SFP corresponding to the SFs existing on the primary SFP.

4. The apparatus according to claim 3, wherein the SF state information synchronization unit controls an amount of traffic used for the synchronizing the primary SFP and the secondary SFP to be a predetermined value or less.

5. The apparatus according to claim 1, wherein the flow transmission control unit changes the transmission path so that the flow is transferred to the secondary SFP in order to provide a continuous service when an error occurs in the primary SFP during transmission of the flow.

6. The apparatus according to claim 1, wherein the SF and SFP error detection unit configures an error detection session by using error detection control packets between devices in which forwarding engines are operating, parameters related to transmission of the error detection control packets are negotiated when the error detection session is established between the forwarding engines, error detection control packets are periodically exchanged and monitored between the forwarding engines according to the negotiated parameters, and the error detection session is terminated in a case that an error detection control packet is not received for a predetermined time.

7. The apparatus according to claim 6, wherein, in asynchronous mode, the SF and SFP error detection unit determines that an error has occurred in a case that the error detection control packet is not received for a predetermined time, and terminates the error detection session.

8. The apparatus according to claim 6, wherein, when an echo function is used, the SF and SFP error detection unit terminates the error detection session when a certain amount of each of the error detection control packets for error detection is lost.

* * * * *